United States Patent
Kim (10) Patent No.: US 10,389,148 B2
(45) Date of Patent: Aug. 20, 2019

(54) BATTERY PROTECTION CIRCUIT EMPLOYING THERMISTOR SENSING OF CHARGING SWITCH AND DISCHARGING SWITCH

(71) Applicant: SAMSUNG SDI CO., LTD., Yongin-si, Gyeonggi-do (KR)

(72) Inventor: Young-Jun Kim, Yongin-si (KR)

(73) Assignee: Samsung SDI Co., Ltd., Youngin-si (KR)

(*) Notice: Subject to any disclaimer, the term of this patent is extended or adjusted under 35 U.S.C. 154(b) by 444 days.

(21) Appl. No.: 14/879,058

(22) Filed: Oct. 8, 2015

(65) Prior Publication Data

US 2016/0301224 A1  Oct. 13, 2016

(30) Foreign Application Priority Data

Apr. 10, 2015  (KR) .................. 10-2015-0050921

(51) Int. Cl.
*H02J 7/00* (2006.01)
*H01M 10/42* (2006.01)
(Continued)

(52) U.S. Cl.
CPC ......... *H02J 7/0031* (2013.01); *H01M 10/425* (2013.01); *H01M 10/443* (2013.01);
(Continued)

(58) Field of Classification Search
CPC ........ H02J 7/0031; H02J 7/0029; H02J 7/007; H01M 10/425; H01M 10/443; H02H 5/042; H02H 7/18
(Continued)

(56) References Cited

U.S. PATENT DOCUMENTS 4,992,722 A * 2/1991 Maruyama ............ H02J 7/1453
320/150
5,373,141 A * 12/1994 Ko ..................... G03G 15/2003
219/481

(Continued)

FOREIGN PATENT DOCUMENTS

JP         2006-136061 A      5/2006
KR       20040036819 A  *   5/2004
KR      10-2010-0044487 A    4/2010

OTHER PUBLICATIONS

"Temperature Measurements with Thermistors: How-to Guide," National Instruments, Published Online Apr. 1, 2015, Accessed Online Sep. 2017.*

(Continued)

*Primary Examiner* — Robert J Grant
*Assistant Examiner* — John T Trischler
(74) *Attorney, Agent, or Firm* — Lewis Roca Rothgerber Christie LLP (57) ABSTRACT

An exemplary embodiment of the present invention provides a battery protection circuit including a battery, a fuse, a charging switch including a first body diode that is forward biased in a discharge path direction, a discharging switch including a second body diode that is forward biased in a charge path direction, a thermistor including a first end and a second end, the first end being coupled between the charging switch and the discharging switch, and a controller configured to sense a voltage value from the second end of the thermistor, and configured to control the fuse, the charging switch, and the discharging switch.

6 Claims, 3 Drawing Sheets

(51) Int. Cl.
   *H01M 10/44* (2006.01)
   *H02H 5/04* (2006.01)
   *H02H 7/18* (2006.01)

(52) U.S. Cl.
   CPC .............. *H02H 5/042* (2013.01); *H02H 7/18* (2013.01); *H02J 7/007* (2013.01); *H02J 7/0029* (2013.01)

(58) Field of Classification Search
   USPC ......................................................... 320/134
   See application file for complete search history.

(56) References Cited

U.S. PATENT DOCUMENTS

| | | | | |
|---|---|---|---|---|
| 5,410,238 | A * | 4/1995 | Ishizuka | H02J 7/0091 320/150 |
| 5,783,998 | A * | 7/1998 | Nakajou | G01R 31/3655 324/426 |
| 5,867,008 | A * | 2/1999 | Du | H02J 7/0031 320/136 |
| 5,890,780 | A * | 4/1999 | Tomiyori | H02J 7/0031 307/86 |
| 5,963,019 | A * | 10/1999 | Cheon | H02H 7/18 320/134 |
| 6,060,834 | A * | 5/2000 | Vilkinofsky | H03K 17/08142 307/10.8 |
| 6,160,377 | A * | 12/2000 | Fujii | H02J 7/0024 320/117 |
| 6,222,346 | B1 * | 4/2001 | Mori | H02J 7/0031 320/134 |
| 6,239,580 | B1 * | 5/2001 | Toya | H02J 7/0078 320/137 |
| 6,288,881 | B1 * | 9/2001 | Melvin | H02J 7/1461 361/104 |
| 6,297,617 | B1 * | 10/2001 | Aoyama | H02J 7/022 320/127 |
| 6,304,061 | B1 * | 10/2001 | Toya | H01M 10/441 320/128 |
| 6,456,948 | B1 * | 9/2002 | Lim | H01M 10/4257 320/134 |
| 6,524,739 | B1 * | 2/2003 | Iwaizono | H01M 2/34 429/185 |
| 6,664,000 | B1 * | 12/2003 | Sonobe | H01M 2/34 429/100 |
| 6,771,042 | B2 * | 8/2004 | Chen | H02J 7/0073 320/110 |
| 6,774,636 | B2 * | 8/2004 | Guiheen | G01R 31/3624 320/132 |
| 6,804,100 | B2 * | 10/2004 | Astala | H02J 7/0029 320/134 |
| 6,948,078 | B2 * | 9/2005 | Odaohhara | G06F 1/26 713/300 |
| 7,019,493 | B2 * | 3/2006 | Astala | H02J 7/0029 320/134 |
| 7,068,012 | B1 * | 6/2006 | Geren | H01M 2/348 320/134 |
| 7,079,003 | B2 * | 7/2006 | Furuta | H02H 7/18 337/184 |
| 7,098,626 | B2 * | 8/2006 | Seo | B60L 3/0046 320/150 |
| 7,215,096 | B2 * | 5/2007 | Miura | H02J 7/0031 320/134 |
| 7,375,498 | B2 * | 5/2008 | Yamamoto | H01M 10/486 320/136 |
| 7,391,185 | B2 * | 6/2008 | Tsubaki | H02J 7/0031 320/150 |
| 7,463,009 | B2 * | 12/2008 | Chang | H01M 10/4207 320/118 |
| 7,502,700 | B2 * | 3/2009 | Iwaizono | H02J 7/0029 320/134 |
| 7,514,903 | B2 * | 4/2009 | Lee | H02J 7/0031 320/112 |
| 7,528,580 | B2 * | 5/2009 | Sim | G01R 31/3675 320/150 |
| 7,533,284 | B2 * | 5/2009 | Chen | G06F 1/26 320/150 |
| 7,535,200 | B2 * | 5/2009 | Chang | H01M 10/4207 320/118 |
| 7,550,950 | B2 * | 6/2009 | Tsubaki | H02J 7/0031 320/150 |
| 7,570,025 | B2 * | 8/2009 | Kim | G01R 31/36 320/112 |
| 7,592,778 | B2 * | 9/2009 | Ooshita | H02J 7/0031 307/10.7 |
| 7,602,146 | B2 * | 10/2009 | Carrier | B25F 5/00 320/116 |
| 7,642,747 | B2 * | 1/2010 | Morioka | H01M 10/441 320/112 |
| 7,667,435 | B2 * | 2/2010 | Denning | H01M 10/42 320/132 |
| 7,675,263 | B2 * | 3/2010 | Kawasumi | H01M 2/34 320/110 |
| 7,688,038 | B2 * | 3/2010 | Chen | H02J 7/0016 320/116 |
| 7,688,075 | B2 * | 3/2010 | Kelley | G01R 31/3662 320/132 |
| 7,719,237 | B2 * | 5/2010 | Roh | H02J 7/0031 320/150 |
| 7,737,660 | B2 * | 6/2010 | Yun | H02J 7/0004 320/132 |
| 7,741,815 | B2 * | 6/2010 | Cassidy | A61M 5/44 219/520 |
| 7,808,212 | B2 * | 10/2010 | Litingtun | H02J 7/0031 320/134 |
| 7,816,889 | B2 * | 10/2010 | Yang | H02J 7/0031 320/132 |
| 7,830,120 | B2 * | 11/2010 | Ibrahim | H02J 7/0031 307/10.7 |
| 7,830,121 | B2 * | 11/2010 | Sasaki | H02J 7/0031 320/106 |
| 7,928,696 | B2 * | 4/2011 | Odaohhara | H01M 10/48 320/112 |
| 7,952,330 | B2 * | 5/2011 | Mori | H01M 2/34 320/144 |
| 7,956,583 | B2 * | 6/2011 | Cassidy | A61M 5/44 320/150 |
| 7,969,119 | B2 * | 6/2011 | Odaohhara | H02J 7/045 320/134 |
| 8,004,244 | B2 * | 8/2011 | Cromer | H01M 2/1066 320/134 |
| 8,058,846 | B2 * | 11/2011 | Kim | H02J 7/0011 320/134 |
| 8,098,051 | B2 * | 1/2012 | Litingtun | H02J 7/0031 320/134 |
| 8,125,190 | B2 * | 2/2012 | Odaohhara | H02J 7/045 320/112 |
| 8,148,944 | B2 * | 4/2012 | Goto | H01M 10/44 320/128 |
| 8,148,946 | B2 * | 4/2012 | Takeda | H01M 10/443 320/134 |
| 8,179,096 | B2 * | 5/2012 | Bernard | H02J 7/041 320/134 |
| 8,183,835 | B2 * | 5/2012 | Takeda | H01M 2/34 320/112 |
| 8,193,774 | B2 * | 6/2012 | Takeda | H01M 2/34 320/128 |
| 8,198,856 | B2 * | 6/2012 | Koide | G06F 1/26 320/106 |
| 8,217,628 | B2 * | 7/2012 | Yang | H02J 7/0031 320/134 |
| 8,254,075 | B2 * | 8/2012 | Higashida | H03K 17/0822 361/103 |
| 8,269,458 | B2 * | 9/2012 | Cruise | H01M 10/425 320/112 |
| 8,305,041 | B2 * | 11/2012 | Takeda | H01M 10/0525 320/134 |
| 8,305,044 | B2 * | 11/2012 | Kawamoto | H01M 10/425 320/152 |

(56) References Cited

U.S. PATENT DOCUMENTS

| | | | | |
|---|---|---|---|---|
| 8,487,630 B2* | 7/2013 | Mori | H01M 10/482 | 320/116 |
| 8,487,778 B2* | 7/2013 | Kang | H01M 10/465 | 320/101 |
| 8,493,034 B2* | 7/2013 | Aiura | H02J 7/0091 | 320/150 |
| 8,524,385 B2* | 9/2013 | Takeda | H01M 2/34 | 429/90 |
| 8,541,977 B2* | 9/2013 | Hasegawa | H01F 27/2871 | 320/108 |
| 8,663,827 B2* | 3/2014 | Park | H01M 2/0212 | 429/100 |
| 8,687,338 B2* | 4/2014 | Odaohhara | H02J 7/0031 | 320/134 |
| 8,691,408 B2* | 4/2014 | Hong | H01M 2/34 | 429/176 |
| 8,704,491 B2* | 4/2014 | Sugiura | H02J 7/0031 | 320/134 |
| 8,796,997 B2* | 8/2014 | Cassidy | A61M 5/44 | 219/520 |
| 8,797,173 B2* | 8/2014 | Kang | H01M 10/465 | 320/103 |
| 8,803,486 B2* | 8/2014 | Norimatsu | H02M 1/36 | 307/10.1 |
| 8,878,492 B2* | 11/2014 | Furukawa | H01M 10/425 | 307/48 |
| 8,883,331 B2* | 11/2014 | Kim | H01M 2/0404 | 361/103 |
| 8,927,126 B2* | 1/2015 | Kim | H01M 2/0404 | 429/62 |
| 8,929,046 B2* | 1/2015 | Cyuzawa | H02H 3/087 | 361/101 |
| 9,028,988 B2* | 5/2015 | Nakanouchi | B60L 11/007 | 429/7 |
| 9,083,178 B2* | 7/2015 | Kim | H02H 3/08 | |
| 9,130,383 B2* | 9/2015 | Mukai | H02J 7/0031 | |
| 9,270,106 B2* | 2/2016 | Ueno | H02K 11/25 | |
| 9,276,432 B2* | 3/2016 | Kang | H01M 10/465 | |
| 9,287,728 B2* | 3/2016 | Odaohhara | H01M 10/443 | |
| 9,331,365 B2* | 5/2016 | Cruise | H01M 10/425 | |
| 9,438,050 B2* | 9/2016 | Takeda | H01M 10/0525 | |
| 9,484,763 B2* | 11/2016 | Kim | H02J 7/007 | |
| 9,705,356 B2* | 7/2017 | Desbois-Renaudin | H02J 7/34 | |
| 2001/0054847 A1* | 12/2001 | Yoshida | H02J 13/0003 | 307/10.1 |
| 2002/0195996 A1* | 12/2002 | Nakatsuji | G01R 31/3624 | 320/127 |
| 2003/0112011 A1* | 6/2003 | Guiheen | G01R 31/3624 | 324/429 |
| 2003/0117112 A1* | 6/2003 | Chen | H02J 7/0073 | 320/137 |
| 2004/0189259 A1* | 9/2004 | Miura | H02J 7/0031 | 320/134 |
| 2005/0077878 A1* | 4/2005 | Carrier | B25F 5/00 | 320/134 |
| 2005/0134232 A1* | 6/2005 | Yamamoto | H01M 10/486 | 320/150 |
| 2005/0206347 A1* | 9/2005 | Seo | B60L 3/0046 | 320/150 |
| 2005/0225421 A1* | 10/2005 | Furuta | H02H 7/18 | 337/167 |
| 2006/0076926 A1* | 4/2006 | Lee | H02J 7/0031 | 320/112 |
| 2006/0093896 A1* | 5/2006 | Hong | H01M 2/34 | 429/61 |
| 2006/0139007 A1* | 6/2006 | Kim | G01R 31/36 | 320/134 |
| 2006/0164041 A1* | 7/2006 | Ooshita | H02J 7/0031 | 320/150 |
| 2006/0164042 A1* | 7/2006 | Sim | G01R 31/3675 | 320/150 |
| 2006/0259794 A1* | 11/2006 | Chen | G06F 1/26 | 713/300 |
| 2007/0105010 A1* | 5/2007 | Cassidy | A61M 5/44 | 429/90 |
| 2007/0159135 A1* | 7/2007 | Teraoka | H02J 7/0004 | 320/112 |
| 2007/0164709 A1* | 7/2007 | Tsubaki | H02J 7/0031 | 320/134 |
| 2007/0188135 A1* | 8/2007 | Odaohhara | H02J 7/0004 | 320/114 |
| 2007/0188148 A1* | 8/2007 | Kawasumi | H01M 2/34 | 320/134 |
| 2007/0229026 A1* | 10/2007 | Morioka | H01M 10/441 | 320/112 |
| 2007/0257635 A1* | 11/2007 | Yang | H02J 7/0031 | 320/107 |
| 2007/0273328 A1* | 11/2007 | Nam | H02J 7/0091 | 320/112 |
| 2008/0012529 A1* | 1/2008 | Chang | H01M 10/4207 | 320/116 |
| 2008/0012531 A1* | 1/2008 | Chang | H01M 10/4207 | 320/134 |
| 2008/0018304 A1* | 1/2008 | Litingtun | H02J 7/0031 | 320/134 |
| 2008/0042618 A1* | 2/2008 | Cromer | H01M 2/1066 | 320/134 |
| 2008/0048621 A1* | 2/2008 | Yun | H02J 7/0004 | 320/136 |
| 2008/0111520 A1* | 5/2008 | Sasaki | H02J 7/0031 | 320/134 |
| 2008/0116851 A1* | 5/2008 | Mori | H01M 2/34 | 320/134 |
| 2008/0180059 A1* | 7/2008 | Carrier | B25F 5/00 | 320/112 |
| 2008/0238358 A1* | 10/2008 | Koide | G06F 1/26 | 320/106 |
| 2008/0246441 A1* | 10/2008 | Tsubaki | H02J 7/0031 | 320/150 |
| 2008/0284380 A1* | 11/2008 | Chen | H02J 7/0016 | 320/154 |
| 2008/0297116 A1* | 12/2008 | Odaohhara | H01M 2/34 | 320/137 |
| 2008/0303487 A1* | 12/2008 | Bernard | H02J 7/041 | 320/163 |
| 2009/0001935 A1* | 1/2009 | Odaohhara | H02J 7/0031 | 320/134 |
| 2009/0009143 A1* | 1/2009 | Odaohhara | H02J 7/0026 | 320/162 |
| 2009/0015197 A1* | 1/2009 | Sogabe | H02J 7/0011 | 320/108 |
| 2009/0021212 A1* | 1/2009 | Hasegawa | H01F 27/2871 | 320/108 |
| 2009/0058365 A1* | 3/2009 | Goto | H01M 10/44 | 320/134 |
| 2009/0072790 A1* | 3/2009 | Ibrahim | H02J 7/0031 | 320/134 |
| 2009/0085519 A1* | 4/2009 | Kim | H02J 7/0011 | 320/134 |
| 2009/0102424 A1* | 4/2009 | Tien | H02J 7/0022 | 320/124 |
| 2009/0160405 A1* | 6/2009 | Takeda | H01M 10/0525 | 320/152 |
| 2009/0202890 A1* | 8/2009 | Takeda | H01M 2/34 | 429/62 |
| 2009/0280398 A1* | 11/2009 | Park | H01M 2/0212 | 429/100 |
| 2009/0295334 A1* | 12/2009 | Yang | H02J 7/0031 | 320/134 |
| 2010/0085018 A1* | 4/2010 | Cruise | H01M 10/425 | 320/150 |
| 2010/0090652 A1* | 4/2010 | Takeda | H01M 10/443 | 320/134 |
| 2010/0092844 A1* | 4/2010 | Takeda | H01M 2/34 | 429/90 |
| 2010/0098974 A1* | 4/2010 | Kim | H01M 2/0404 | 429/7 |

(56) References Cited

U.S. PATENT DOCUMENTS

| | | | |
|---|---|---|---|
| 2010/0190052 A1* | 7/2010 | Rajani | H01M 2/1055 429/178 |
| 2010/0196747 A1* | 8/2010 | Takeda | H01M 10/486 429/61 |
| 2010/0201327 A1* | 8/2010 | Takeda | H01M 2/34 320/154 |
| 2010/0253288 A1* | 10/2010 | Cassidy | A61M 5/44 320/118 |
| 2010/0264883 A1* | 10/2010 | Aiura | H02J 7/0091 320/150 |
| 2010/0302050 A1* | 12/2010 | Kang | H01M 10/465 340/636.2 |
| 2011/0018501 A1* | 1/2011 | Litingtun | H02J 7/0031 320/153 |
| 2011/0019326 A1* | 1/2011 | Odaohhara | H02J 7/0031 361/104 |
| 2011/0050175 A1* | 3/2011 | Odaohhara | H01M 10/443 320/134 |
| 2011/0084702 A1* | 4/2011 | Mori | G01R 31/3679 324/430 |
| 2011/0169458 A1* | 7/2011 | Sugiura | H02J 7/0031 320/134 |
| 2011/0238012 A1* | 9/2011 | Cassidy | A61M 5/44 604/113 |
| 2011/0316489 A1* | 12/2011 | Norimatsu | H02M 1/36 320/166 |
| 2012/0021255 A1* | 1/2012 | Kim | H01M 10/441 429/7 |
| 2012/0099236 A1* | 4/2012 | Cyuzawa | H02J 1/06 361/101 |
| 2012/0169289 A1* | 7/2012 | Kim | H01M 2/105 320/134 |
| 2012/0176097 A1* | 7/2012 | Takezawa | H01M 4/386 320/134 |
| 2012/0225328 A1* | 9/2012 | Nakanouchi | B60L 11/007 429/7 |
| 2012/0286732 A1* | 11/2012 | Cruise | H01M 10/425 320/112 |
| 2012/0293900 A1* | 11/2012 | Kim | H02H 3/08 361/86 |
| 2013/0026997 A1* | 1/2013 | Takeda | H01M 10/0525 320/134 |
| 2013/0181681 A1* | 7/2013 | Mukai | H02J 7/0031 320/134 |
| 2013/0249488 A1* | 9/2013 | Ju | B60L 11/1859 320/112 |
| 2013/0278202 A1* | 10/2013 | Kang | H01M 10/465 320/101 |
| 2014/0097788 A1* | 4/2014 | Kim | H02J 7/007 320/107 |
| 2014/0103876 A1* | 4/2014 | Kim | H02J 7/007 320/112 |
| 2014/0111013 A1* | 4/2014 | Desbois-Renaudin | H02J 7/34 307/52 |
| 2014/0111161 A1* | 4/2014 | Kim | H01M 10/42 320/128 |
| 2014/0340020 A1* | 11/2014 | Kang | H01M 10/465 320/101 |
| 2015/0002973 A1* | 1/2015 | Yamashita | H02H 5/047 361/103 |
| 2015/0044511 A1* | 2/2015 | Kim | H01M 10/425 429/7 |
| 2015/0115875 A1* | 4/2015 | Oomiya | H02J 7/0068 320/107 |
| 2015/0145484 A1* | 5/2015 | Shibata | H01M 10/4257 320/134 |
| 2015/0295280 A1* | 10/2015 | Cho | H01M 10/425 429/158 |
| 2016/0043583 A1* | 2/2016 | Yoshida | H02J 7/0026 320/112 |
| 2016/0059730 A1* | 3/2016 | Ishibashi | B60L 11/1816 307/10.1 |
| 2016/0248075 A1* | 8/2016 | Cruise | H01M 10/425 |
| 2017/0207642 A1* | 7/2017 | Sato | H02J 7/0031 |

OTHER PUBLICATIONS

"Why does fuse blow up sometimes?" Russell McMahon, Electrical Engineering Stack Exchange, Published Online Jan. 23, 2012, Accessed Online May 5, 2018, electronics.stackexchange.com/questions/25508/why-does-fuse-blow-up-sometimes.*

* cited by examiner

BATTERY PROTECTION CIRCUIT EMPLOYING THERMISTOR SENSING OF CHARGING SWITCH AND DISCHARGING SWITCH

CROSS-REFERENCE TO RELATED APPLICATION

This application claims priority to and the benefit of Korean Patent Application No. 10-2015-0050921 filed in the Korean Intellectual Property Office on Apr. 10, 2015, the entire contents of which is incorporated herein by reference.

BACKGROUND

1. Field

The present invention relates to a battery protective circuit, and more particularly, to a battery protective circuit including a thermistor.

2. Description of the Related Art

A battery may utilize a battery protective circuit for controlling charge and discharge, and for preventing overcharge and over-discharge, when the battery is coupled to an external device.

This battery protective circuit includes a charging switch and a discharging switch, each of which is formed of an electric field effect transistor (FET). The charging switch and the discharging switch are turned on and off by a control integrated circuit (IC).

However, if the charging switch and/or the discharging switch is damaged, although an off-control signal is transmitted from the control IC, the charging switch or the discharging switch may not turn off. That is, a current may continuously flow therein.

In this case, it may be desirable to provide a circuit configuration for detecting whether the charging switch or the discharging switch is damaged when attempting to perform a battery protecting/protection function.

The above-information disclosed in this Background section is only for enhancement of understanding of the background of the invention and therefore it may contain information that does not form the prior art that is already known to a person of ordinary skill in the art.

SUMMARY

Embodiments of the present invention have been made in an effort to provide a battery protective circuit for performing a second, or additional, protecting function/protection function at a lower cost.

An aspect of an exemplary embodiment of the present invention provides a battery protective circuit including: a battery; a fuse; a charging switch including a first body diode that is forward biased in a discharge path direction; a discharging switch including a second body diode that is forward biased in a charge path direction; a thermistor comprising a first end and a second end, the first end being coupled between the charging switch and the discharging switch; and a controller configured to sense a voltage value from the second end of the thermistor, and configured to control the fuse, the charging switch, and the discharging switch.

The first end of the thermistor may include a heat-conductive pattern.

The controller may be configured to perform a protection function, the protection function including: sensing damage of the charging switch or of the discharging switch by sensing voltage variation corresponding to resistance variation of the thermistor; and blowing the fuse.

The controller may be configured to perform a first protection function, the first protection function including: turning off the discharging switch in an over-discharge prevention mode; and turning off the charging switch in an overcharge prevention mode.

The controller may be configured to: detect that the first protection function is improperly performed by sensing voltage variation corresponding to resistance variation of the thermistor; and perform an additional protection function by blowing the fuse.

A thermistor resistance of the thermistor may change when a temperature of at least one of the charging switch and the discharging switch increases.

The battery protection circuit may further include: a comparative resistor including a first end and a second end, the first end being coupled to a reference voltage node, and the second end being coupled to the controller, wherein the controller is configured to detect that the first protection function is improperly performed by comparing a first voltage sensed through the comparative resistor and a second voltage sensed through the thermistor.

A comparative resistor resistance of the comparative resistor may be matched with the thermistor resistance of the thermistor by reflecting a resistance value of at least one element between one end of the thermistor and one end of the comparative resistor.

According to the aspects of the exemplary embodiment of the present invention, a battery protective circuit may be provided which can perform the second/additional protecting function at a lower cost.

DETAILED DESCRIPTION

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Figure 1:
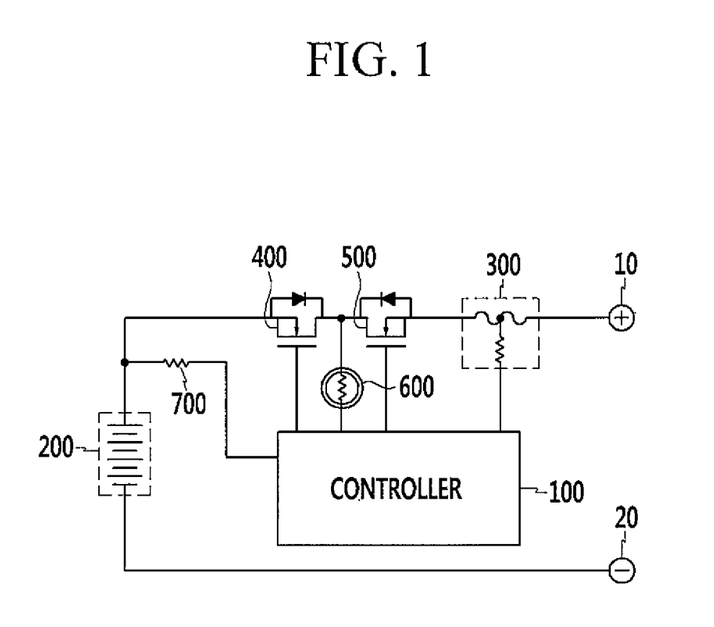
FIG. 1 illustrates a battery protective circuit according to an exemplary embodiment of the present invention.

FIG. 1 illustrates a battery protective circuit according to an exemplary embodiment of the present invention.

Referring to FIG. 1, the battery protective circuit according to the exemplary embodiment of the present invention includes a controller 100, a battery 200, a fuse 300, a charging switch 400, a discharging switch 500, a thermistor 600, and a comparative resistor 700.

An external device may be coupled to an external positive terminal 10 and to an external negative terminal 20. This external device may be a charging device that charges the battery 200, or may be a discharging device that consumes power from the battery 200.

Accordingly, the battery 200, the charging switch 400, the discharging switch 500, the fuse 300, the external positive terminal 10, the external device, and the external negative terminal 20 constitutes a current path (e.g., a high current path).

The battery 200 may include a single battery cell or a plurality of battery cells. In FIG. 1, the battery 200 is illustrated to include four battery cells. However, the number of battery cells and the connection relationships between the battery cells (e.g., whether in series and/or in parallel) may be changed according to the exemplary embodiments.

The battery 200 includes positive and negative electrodes and is re-chargeable. Each of the battery cells may be formed of, for example, a lithium ion battery, a lithium polymer battery, or the like.

The charging switch 400 may be formed of an electric field effect transistor (FET). When formed of an electric field effect transistor, the charging switch 400 includes a body diode, and a bias direction of the body diode may be set (e.g., adjusted or changed).

The body diode included in the charging switch 400 is formed such that a discharge path direction is a forward bias direction. This formation of the body diode in the forward bias direction facilitates preventing a current from flowing in the charge path direction in the overcharge preventing mode/overcharge prevention mode while still allowing discharge.

Similarly, the discharging switch 500 may also be formed of an electric field effect transistor. When formed of an electric field effect transistor, the discharging switch 500 includes a body diode, and a bias direction of the body diode may be set (e.g., adjusted or changed).

The body diode included in the discharging switch 500 is formed such that a charge path direction is a forward bias direction. This formation of the body diode in the forward bias direction facilitates preventing a current from flowing in the discharge path direction in the over-discharge preventing mode/over-discharge prevention mode while still allowing for charging.

In the described exemplary embodiment, each of the charging switch 400 and discharging switch 500 is formed of an N-type electric field effect transistor, but may also be formed of a P-type electric field effect transistor.

When a positive voltage is applied to the control terminal, the N-type electric field effect transistor is turned on. When a negative voltage is applied to the control terminal, the N-type electric field effect transistor is turned off. The magnitude of the voltages used to control the electric field effect transistor may be varied according to a configuration of the electric field effect transistor.

The thermistor 600 is an element having varying resistance according to a sensed temperature. According to an embodiment, the thermistor 600 may be a positive temperature coefficient thermistor. In the present embodiment, the resistance of the thermistor 600 increases according to an increase in the temperature.

In the present exemplary embodiment, a first end of the thermistor 600 is coupled to a contact point between the charging switch 400 and the discharging switch 500. A second end of the thermistor 600 is coupled to the controller 100.

In the present exemplary embodiment, the first end of the thermistor 600 is formed in a heat-conductive pattern. According to a conventional art, the charging switch 400, the discharging switch 500, and the thermistor 600 may be coated with heat-conductive silicon for electrical connection. In the present embodiment, the accuracy of temperature sensing may be lowered according to an amount and a shape of the heat-conductive silicon. Further, a process cost may be increased due to an added step of coating the heat-conductive silicon.

In the present exemplary embodiment, the cost for manufacture can be lowered by removing the step of coating the heat-conductive silicon. Further, the heat-conductive pattern may be formed together in a wire-patterning step, and thus the process cost is not increased. In addition, temperature measurement can be precisely performed by standardizing the heat-conductive pattern.

According to an embodiment, the heat-conductive pattern also serves as a conductive wire for sensing voltages, and thus an additional voltage sensing pattern is not formed, thereby conserving space. Accordingly, the battery pack may be miniaturized.

According to an embodiment, a first end and a second end of the comparative resistor 700 are coupled to a reference voltage node and to the controller 100, respectively. In the present exemplary embodiment, the reference voltage node is a positive electrode of the battery 200.

As illustrated herein, the controller 100 may be formed of one IC, but may also be formed of two or more ICs. For example, the controller 100 may be formed of a first IC for performing a first protecting function, and of a second IC for performing an additional/second protecting function. This configuration of the controller 100 may be changed according to a product standard or specification. Accordingly, in the present exemplary embodiment, it is assumed that the controller 100 is designed to perform both the first protecting function and the second/additional protecting function.

According to an embodiment, the fuse 300 is disposed at the high current path and has a first end coupled to the controller 100. When a set (e.g., predetermined) amount of current flows in the fuse 300 (which has resistance), the fuse 300 is cut off, or blows, due to an exothermic phenomenon, thereby blocking/disrupting the high current path.

According to another embodiment, the controller 100 may completely open the high current path by turning on both of the charging switch 400 and the discharging switch 500 in the charge mode and the discharge mode.

However, when the battery 200 is overcharged or over-discharged, the first protecting function is performed to prevent further charging or discharging. The performance of the first protecting function indicates execution of the overcharge preventing mode or the over-discharge preventing mode.

Figure 2:
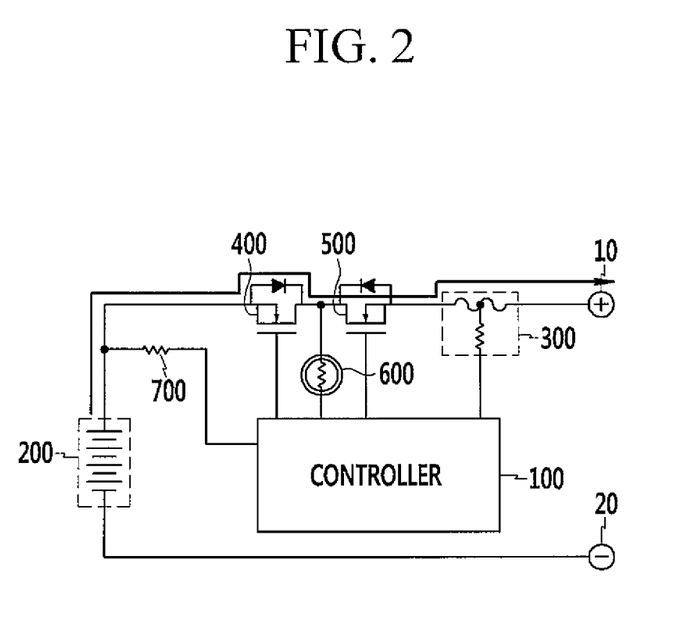
FIG. 2 illustrates a battery protective circuit operating in an overcharge preventing mode.
Figure 3:
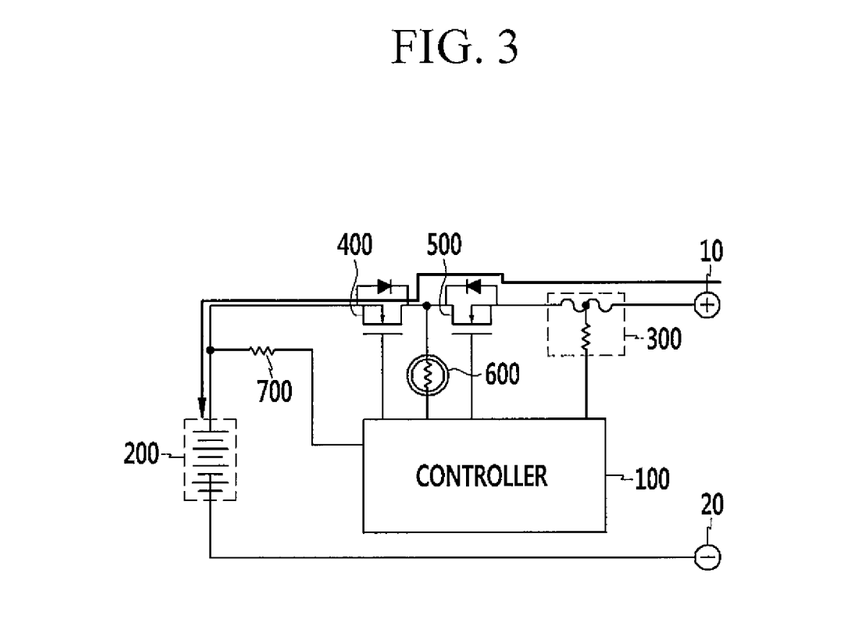
FIG. 3 illustrates a battery protective circuit operating in an over-discharge preventing mode.

Hereinafter, the overcharge preventing mode and the over-discharge preventing mode will be described with reference to FIG. 2 and FIG. 3. FIG. 2 illustrates an overcharge preventing mode, and FIG. 3 illustrates an over-discharge preventing mode.

First, referring to FIG. 2, when the battery 200 is overcharged, further charging of the battery 200 is prevented. In this case, discharge is performed to release an overcharged state.

The controller 100 applies an off-level control signal to a control terminal of the charging switch 400, and applies an on-level control signal to a control terminal of the discharging switch 500. Accordingly, the charging switch 400 is turned off, and the discharging switch 500 is turned on.

Because the charging switch 400 is turned off and because the body diode included in the charging switch 400 is formed in the discharge path direction, a current is prevented from flowing in the charge path direction.

In this case, as a current path is illustrated by an arrow in FIG. 2, the discharge is performed through the positive electrode of the battery 200, the body diode of the charging switch 400, the discharging switch 500, the fuse 300, and the external positive terminal 10.

As such, the overcharge preventing mode of the present exemplary embodiment can be executed.

Next, referring to FIG. 3, when the battery 200 is overdischarged, the discharging of the battery 200 is prevented. In this case, charge is performed to release an over-discharged state.

The controller 100 applies the on-level control signal to the control terminal of the charging switch 400, and applies the off-level control signal to the control terminal of the discharging switch 500. Accordingly, the charging switch 400 is turned on, and the discharging switch 500 is turned off.

Since the discharging switch 500 is turned off and the body diode included in the discharging switch 500 is formed in the charge path direction, a current is prevented from flowing in the discharge path direction.

In this case, as a current path is illustrated by an arrow in FIG. 3, the charging is performed through the external positive terminal 10, the fuse 300, the body diode of the discharging switch 500, the charging switch 400, and the positive electrode of the battery 200.

As such, the over-discharge preventing mode of the present exemplary embodiment can be executed.

However, when the overcharge preventing mode and the over-discharge preventing mode are not executed normally, the controller 100 performs the second/additional protecting function.

When the overcharge preventing mode is not executed normally/properly executed, the charging switch 400 may be damaged, thereby allowing current to continuously flow to the battery 200. In this case, even in the overcharge preventing mode, the charge path is closed, and thus the charging current may continue to flow into the battery 200.

When the over-discharge preventing mode is not executed normally, the discharging switch 500 may be damaged, thereby allowing a current to continuously flow from the battery 200. In this case, even in the over-discharge preventing mode, the discharge path is closed, and thus the battery 200 may be further discharged.

Accordingly, the second/additional protecting function is performed by the controller 100. This will be described in detail below.

When the charging switch 400 or the discharging switch 500 is damaged, thus allowing current to flow continuously, heat is generated in the charging switch 400 or the discharging switch 500.

Accordingly, the thermistor 600 is heated through the heat-conductive pattern coupled to the contact point between the charging switch 400 and the discharging switch 500, thereby increasing the resistance of the thermistor 600.

The controller 100 detects that the first protecting function is not performed by comparing a voltage sensed through the thermistor 600 and a voltage sensed through the comparative resistor 700.

According to an embodiment, in a normal state or in a state in which the first protecting function is performed, a difference between the voltage sensed through the thermistor 600 and the voltage sensed through the comparative resistor 700 does not exceed a threshold level.

However, when the difference between the voltage sensed through the thermistor 600 and the voltage sensed through the comparative resistor 700 exceeds the threshold level, the controller 100 can detect that the first protecting function is not performed normally.

When the temperature of the thermistor 600 is increased and thus raises the resistance of the thermistor 600, the voltage detected by the controller 100 is decreased.

Accordingly, the controller 100 detects that the first protecting function is not being normally/properly performed.

In this case, a resistance value of at least one element disposed between one end of the thermistor 600 and one end of the comparative resistor 700 can be reflected to the resistance of the comparative resistor 700. Accordingly, the resistance of the comparative resistor 700 and the resistance of the thermistor 600 are matched with each other. That is, a voltage drop caused by each element interposed therebetween is considered.

According to an embodiment, the controller 100 detects that the first protecting function is not performed, and then performs the second/additional protecting function by blowing the fuse 300, or cutting off the fuse 300. Accordingly, the high current path is blocked, and the protection function of the battery 200 is performed.

In another exemplary embodiment, the controller 100 may sense damage of the charging switch 400 or the discharging switch 500 through voltage sensing according to resistance variation of the thermistor 600, and may thereafter cut off the fuse 300.

For example, when the charging switch 400 or the discharging switch 500 is damaged due to a short (e.g., short circuit), overheating is generated in the charging switch 400 or the discharging switch 500 even though the charge and discharge operations are normally performed. This overheating may cause a battery pack protective circuit to be damaged, or may cause an outer circumference of a case of the battery pack to melt or burn.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises,"

"comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The accompanying drawings and the exemplary embodiments of the present invention are only examples of the present invention, and are used to describe the present invention but not to limit the scope of the present invention as defined by the following claims. Thus, it will be understood by those of ordinary skill in the art that various modifications and equivalent embodiments may be made. Therefore, the technical scope of the present invention may be defined by the technical idea of the following claims and their equivalents.

DESCRIPTION OF SOME OF SYMBOLS

10: external positive terminal
20: external negative terminal
100: controller
200: battery
300: fuse
400: charging switch
500: discharging switch
600: thermistor
700: comparative resistor

What is claimed is:

1. A battery protection circuit comprising:
a battery;
a fuse;
a charging switch comprising a first body diode that is forward biased in a discharge path direction;
a discharging switch comprising a second body diode that is forward biased in a charge path direction;
a single thermistor comprising a first end and a second end, the first end being electrically coupled between the charging switch and the discharging switch such that a thermistor resistance of the thermistor changes when a temperature of either of the charging switch and the discharging switch increases;
a controller configured to sense a voltage value from the second end of the thermistor, configured to control the fuse, the charging switch, and the discharging switch, and configured to sense damage to the charging switch or to the discharging switch by voltage sensing; and
a comparative resistor comprising a first end and a second end, the first end being coupled to a reference voltage node, and the second end being coupled to the controller,
wherein the first end of the thermistor comprises a heat-conductive pattern comprising an electrically conductive wire for sensing voltages,
wherein the voltage sensing comprises comparing a voltage sensed through the thermistor and a voltage sensed through the comparative resistor, and wherein the fuse, the battery, the charging switch, and the discharging switch are electrically coupled in series.

2. The battery protection circuit of claim 1, wherein the controller is configured to perform a protection function, the protection function comprising:
sensing damage of the charging switch or of the discharging switch by sensing voltage variation corresponding to resistance variation of the thermistor; and
blowing the fuse.

3. The battery protection circuit of claim 1, wherein the controller is configured to perform a first protection function, the first protection function comprising:
turning off the discharging switch in an over-discharge prevention mode; and
turning off the charging switch in an overcharge prevention mode.

4. The battery protection circuit of claim 1, wherein a comparative resistor resistance of the comparative resistor is matched with the thermistor resistance of the thermistor.

5. The battery protection circuit of claim 3, wherein the controller is configured to detect that the first protection function is improperly performed by comparing a first voltage sensed through the comparative resistor and a second voltage sensed through the thermistor.

6. The battery protection circuit of claim 3, wherein the controller is configured to:
detect that the first protection function is improperly performed by sensing voltage variation corresponding to resistance variation of the thermistor; and
perform an additional protection function by blowing the fuse.

* * * * *